United States Patent Office 3,275,598
Patented Sept. 27, 1966

3,275,598
POLYMERIZATION OF OXIRANE MONOEPOXIDES IN THE PRESENCE OF AN ORGANOMETALLIC COMPOUND AND AN ALCOHOL
Kenneth T. Garty, Somerville, and Thomas B. Gibb, Jr., Murray Hill, N.J., assignors to Union Carbide Corporation, a corporation of New York
No Drawing. Filed July 1, 1959, Ser. No. 824,191
15 Claims. (Cl. 260—47)

This invention relates to the polymerization of oxirane monoepoxide monomers. More particularly, this invention relates to an improved method of polymerizing oxirane monoepoxide monomers whereby relatively high conversions of monomer to polymer are effected in relatively short periods of time.

Polymerization of oxirane monoepoxides in the presence of an organometallic compound, such as dibutyl zinc, which serves as a catalyst for the polymerization reaction, has been found to be desirable as the polymers produced are hard, tough solids which are useful in the manufacture of various shaped articles and in the preparation of film material which can be used in the manufacture of bags, wrapping material, and the like. Moreover, the organometallic compound remaining in the polymer at the termination of the polymerization reaction can be converted into an inert, non-deleterious residue, which can be left in the polymer if so desired, by a simple operation wherein the polymer is contacted with water or an alcohol such as ethyl alcohol. Consequently, solid polymers produced by polymerizing an oxirane monoepoxide in the presence of an organometallic compound do not require any elaborate and time consuming purification operations in order to remove catalyst residue therefrom.

The extensive use of organometallic compounds as catalysts for the polymerization of oxirane monoepoxides to produce solid polymers has been seriously limited, however, due to the relatively long periods of time required in order to obtain any significant polymer yields. In addition, it has not been possible to obtain reproducible yields of solid polymer using organometallic compounds as catalysts. Yields obtained have varied from batch to batch and have been relatively small.

The present invention provides for the production of oxirane monoepoxide polymers by polymerizing a monomeric oxirane monoepoxide and mixtures thereof in the presence of an organometallic compound and also in the presence of a controlled amount of a saturated aliphatic primary alcohol, which serves as a promoter for the polymerization reaction, whereby relatively high conversions of monomer to polymer are effected in a relatively short period of time. Moreover, the presence of a controlled amount of saturated aliphatic primary alcohol in the polymerization reaction allows for reproducibility of polymer yields.

The amount of aliphatic, saturated primary alcohol employed in the polymerization reaction can vary from about 1.25 to about 2 moles of alcohol per mole of the organometallic compound. Optimum results are achieved at a mole ratio of the saturated, aliphatic alcohol to the organometallic compound of about 1.5:1 to about 1.75:1.

Any saturated, aliphatic primary alcohol free of interfering functional groups, such as an ester group, an acid group, an aldehyde group, and an amino group, can be used as a promoter for the polymerization of an oxirane monoepoxide in accordance with the present invention. Illustrative of such monohydric alcohols are methyl alcohol, ethyl alcohol, n-propyl alcohol, isopropyl alcohol, n-butyl alcohol, isobutyl alcohol, n-amyl alcohol, isoamyl alcohol, n-hexyl alcohol, lauryl alcohol, myristyl alcohol, cetyl alcohol, stearyl alcohol, and the like. Particularly desirable are saturated, aliphatic primary alcohols having up to 10 carbon atoms.

The term "polymer" as used herein is intended to encompass homopolymers, as well as copolymers and interpolymers produced by polymerizing a mixture containing two or more monomeric oxirane monoepoxides.

Organometallics which can be employed as catalysts for the polymerization of oxirane monoepoxides to produce solid polymers are compounds whose compositions can be represented by the formula:

$$R_1—Me—R_2$$

wherein Me is a metal of Group II of the Periodic Table, i.e., beryllium, magnesium, calcium, zinc, strontium, cadmium, barium, mercmury, and radium; and wherein $R_1$ and $R_2$ are hydrocarbon radicals such as alkyl, aryl, aralkyl, alkaryl, and cycloalkyl. Particularly desirable organometallics are those compounds having the structural formula noted above wherein $R_1$ and $R_2$ are hydrocarbon radicals having from 1 to 10 carbon atoms and being free from olefinic and acetylenic unsaturation.

Representative $R_1$ and $R_2$ radicals include, among others, methyl, ethyl, propyl, isopropyl, n-butyl, isobutyl, 2-ethylhexyl, dodecyl, octadecyl, phenyl, tolyl, xylyl, benzyl, phenethyl, phenylpropyl, phenylbutyl, cyclopentyl, cyclohexyl, cycloheptyl, 3-propylcyclohexyl, and the like.

Illustrative of organometallic compounds which can be used as catalysts can be noted diethyl zinc, dipropyl zinc, di-n-butyl zinc, dioctadecyl zinc, dicyclohexyl zinc, diphenyl zinc, di-o-tolyl zinc, diethyl magnesium, di-n-butyl magnesium, dioctyl magnesium, diphenyl magnesium, diethyl beryllium, di-n-butyl beryllium, diethyl cadmium, dipropyl cadmium, diisoamyl cadmium, diphenyl cadmium, and the like. The organometallics are known compounds and can be prepared according to the methods described in Berichte 63, 1138 (1934); 59, 931 (1926).

The organometallic compounds are generally used in catalytic amounts, that is, in amounts sufficient to catalyze the polymerization of oxirane monoepoxides to solid polymers. The actual quantity of organometallic compound used can be varied between wide limits, for example, from about 0.01 to about 12 percent by weight and higher, based on the weight of the monomer charged. It is preferred to use an amount of catalyst ranging from about 0.1 to about 3 percent by weight.

The term "oxirane monoepoxide" as used herein is intended to encompass those compounds having a single terminal epoxy group, i.e.:

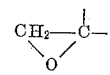

which are free of all other interfering functional groups such as an ester group, an acid group, an amino group, and an aldehyde group.

Among such oxirane monoepoxides can be mentioned the epihalohydrins, such as 1,2-epoxy-3-chloropropane, 1,2-epoxy-3-bromopropane, and the like; the olefin oxides, such as 1,2-epoxyethane, 1,2-epoxypropane, 1,2-epoxybutane, 1,2-epoxypentane, 1,2-epoxyhexane, 1,2-epoxyheptane, cyclopentene oxide, cyclohexene oxide, 1,2 - epoxyphenyl - ethane, 1,2-epoxy-p-methylphenylthane, 1,2-epoxy-o-chlorophenyl ethane, and the like; epoxy-alkyl ethers, such as those having the structural formula

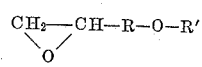

where R' is a hydrocarbon radical such as alkyl, aryl, alkaryl, aralkyl, and the like, and wherein R is saturated aliphatic hydrocarbon radical. Particularly desirable polymers are those produced by polymerizing a monomer having the structural formula noted above wherein R contains from 1 to 4 carbon atoms and R' is a phenyl or alkyl substituted phenyl radical wherein the alkyl substituent contains up to 12 carbon atoms. Illustrative radicals for R include, among others, methylene, ethylene, propylene, butylene, hexylene, octylene, and the like. Representative radicals for R' include, among others, phenyl, 2-, 3-, and 4-methylphenyl, 4-isopropylphenyl, 4-tertiarybutylphenyl, 4-octylphenyl, ethyl, propyl, butyl, amyl, and the like.

Suitable epoxyalkyl ethers include the following:

1,2-epoxy-3-phenoxy-propane,
1,2-epoxy-4-phenoxy-butane,
1,2-epoxy-5-phenoxy-pentane,
1,2-epoxy-6-phenoxy-hexane,
1,2-epoxy-3-(o-methylphenoxy)-propane,
1,2-epoxy-3-(m-methylphenoxy)-propane,
1,2-epoxy-3-(p-methylphenoxy)-propane,
1,2-epoxy-3-(o-isopropylphenoxy)-propane,
1,2-epoxy-3-(p-tertiary butylphenoxy)-propane,
1,2-epoxy-3-(p-octylphenoxy)-propane,
1,2-epoxy-3-(o-chlorophenoxy)-propane,
1,2-epoxy-3-(o-chlorophenoxy)-propane,
1,2-epoxy-3-(2,4-dimethylphenoxy)-propane,
1,2-epoxy-3-(2,3-dimethylphenoxy)-propane,
1,2-epoxy-3-(2,6-dimethylphenoxy)-propane,
1,2-epoxy-3-(2-chloro-4-methylphenoxy)-propane,
1,2-epoxy-3-(o-amylphenoxy)-propane,
1,2-epoxy-4-(o-methylphenoxy)-butane,
1,2-epoxy-4-(2,4-dimethylphenoxy)-butane,
1,2-epoxy-4-(2,5-dimethylphenoxy)-butane,
1,2-epoxy-4-(2,4-dichlorophenoxy)-butane,
1,2-epoxy-4-(2,5-dichlorophenoxy)-butane,
1,2-epoxy-6-phenoxy-hexane,
1,2-epoxy-6-(2,3-dibromophenoxy)-hexane, and the like., The polymerization reaction is conducted by charging an oxirane monoepoxide monomer or mixture of monomers, an organometallic compound and a controlled amount of alcohol in a reaction vessel and generally subjecting the reaction vessel to heat. Actually, the temperature at which the polymerization reaction is conducted can be varied over a wide temperature range, from about 0° C. to about 200° C., and, if desired, even higher. A temperature in the range of about 60° C. to about 175° C. is most preferred.

It is also preferred to conduct the polymerization reaction in the presence of an organic diluent which is non-reactive with respect to the monomer, catalyst, and polymer, is a solvent for the monomer and catalyst mixture, but a non-solvent for the polymer. During the polymerization reaction, particularly whenever about 50 percent or more of the monomer is converted to the polymer, the reaction mixture becomes highly viscous. If a diluent is not present, it is difficult to remove the heat of reaction which, if not removed, might cause undesirable side reactions to occur. In addition, the use of a diluent facilitates removal of unreacted monomer from the polymer.

Illustrative of suitable organic diluents can be noted the aromatic hydrocarbons, such as benzene, chlorobenzene, toluene, xylene, and the like; cycloaliphatics, such as cyclopentane, cyclohexane, isopropyl cyclohexane, and the like; alkoxy compounds, such as methoxybenzene and the like; the dimethyl and diethyl ethers of ethylene glycol, propylene glycol, diethylene glycol; aliphatics, i.e. hexane.

The diluent can be added prior to the commencement of the polymerization reaction or during the polymerization reaction in amounts of from about 5 to 90 parts by weight per 100 parts by weight monomer and diluent.

The polymerization reaction is preferably conducted under an inert atmosphere, e.g., nitrogen, and can be under atmospheric, sub-atmospheric, or super-atmospheric pressures.

The time required to polymerize an oxirane monoepoxide to produce a solid polymer will vary and depend upon a number of factors such as the temperature at which the polymerization reaction is being conducted, the amount and nature of the organometallic catalyst used, and also upon the nature of the monomer employed. Using alcohol as a promoter in accordance with the present invention, relatively high yields of polymer have been obtained in as short a time as four hours.

The crude product resulting from the polymerization reaction usually contains, in addition to the solid polymer, some unreacted monomer, and also catalyst residue. Removal of the unreacted monomer and catalyst residue can be accomplished by any convenient manner. If desired, the catalyst residue can be left in the polymer after first treating the polymer with water or an alcohol, such as ethyl alcohol. For instance, when dibutylzinc is the catalyst used and it is desired to allow the catalyst residue to remain in the polymer, the polymer is conveniently treated with ethyl alcohol whereby the catalyst is converted to its oxide, which oxide is inert and does not have any deleterious effect on the polymer. The ethyl alcohol is driven from the polymer by applying heat thereto. When it is desired to remove both unreacted monomer and catalyst residue from the polymer produced, as for example poly(1,2-epoxy-3-phenoxy-propane), the crude product is dispersed in a mixture of acetone and hydrochloric acid, the dispersion is then filtered, thereby obtaining the polymer as a filtercake and, if necessary, then washing the polymer with small amounts of ethyl alcohol to obtain a white colored solid. Unreacted monomer and catalyst residue can be removed from a polymer such as poly(1,2-epoxyethane) by dissolving the crude product in ethyl alcohol, filtering off the catalyst residue, concentrating the solution to remove the alcohol and recovering the polymer. In general, it is desirable to remove the unreacted monomer from the crude product as the polymer recovered exhibits enhanced thermal and dimensional stability.

The percent conversion of monomer to polymer as noted herein was determined by removing the unreacted monomer and caatlyst residue from the polymer, drying the polymer to a constant weight at a temperature of from about 50° C. to 60° C. under a pressure of 25 mm. Hg, weighing the polymer, dividing the weight of the polymer by the weight of the monomer charged, and multiplying by 100.

In the following examples, which are illustrative of the present invention and not intended to limit the scope thereof in any manner, the reduced viscosity measurements, which are a measure of the molecular weight, were made as follows.

A 0.05 gram sample of polymer was weighed into a 25 ml. volumetric flask and p-chlorophenol containing 2 percent by weight pinene added thereto. The flask was heated for 30 minutes in an oil bath maintained at 140° C. with intermittent swirling. After solution was complete, additional p-chlorophenol containing 2 percent by weight pinene was added to produce a 25 ml. solution while maintaining the flask in a 47° C. constant temperature bath. The solution was thereafter filtered through a sintered glass funnel and the viscosity of a 3 ml. sample determined in a Cannon viscometer at about 47° C.

Reduced viscosity was computed by use of the equation:

$$RV = \frac{t_s - t_o}{ct_o}$$

where:

$t_o$ is the efflux time for the solvent
$t_s$ is the efflux time for the polymer solution
$c$ is the concentration of the solution in terms of grams of polymer per 100 ml. of solution

Example 1

To each of a series of Pyrex glass tubes which had been flushed out with nitrogen gas there was charged 10 grams of 1,2-epoxy-3-phenoxy-propane, 0.15 gram of dibutyl zinc, 13 ml. of toluene, and various amounts of n-butyl alcohol.

Each tube was provided with a nitrogen gas atmosphere, sealed, and heated at 90° C. for 24 hours in an air circulating oven. Each tube was broken open and the contents thereof transferred to a Waring Blendor using 200 ml. of a mixture (50–50 on a volume basis) of acetone and toluene acidified with 5 ml. of 1 N hydrochloric acid. After thorough agitation in the Waring Blendor, the mixture was poured into ethyl alcohol. The amount of ethyl alcohol was 100 times the volume of the mixture. The polymer precipitated out of the ethyl alcohol and was recovered as a filter cake. The polymer was then washed with small quantities of ethyl alcohol, dried at 60° C. for 24 hours under a pressure of 25 mm. Hg and then dried an additional 24 hours at a temperature of from 40° C. to 60° C. and under a pressure of 25 mm. Hg.

The percent conversion of monomer to polymer, the mole ratio of alcohol to dibutyl zinc, and the reduced viscosity of the polymer obtained are noted in the table below.

|  | Control | 1 | 2 | 3 |
|---|---|---|---|---|
| Mole ratio of n-butanol to dibutyl zinc | 0 | 1.25:1 | 1.5:1 | 1.75:1 |
| Percent conversion | 1.3 | 27.0 | 38.9 | 39.1 |
| Reduced viscosity |  | 8.4 | 8.5 | 9.1 |

The solid white colored polymer obtained was hard, tough, insoluble in water and at room temperature insoluble in methanol, ethanol, diethyl ether, dioxane, acetone, methyl ethyl ketone, ethyl acetate, tetrahydrofuran, chloroform, methylene chloride, carbon disulfide, benzene, toluene, and the like.

The 1,2-epoxy-3-phenoxy-propane used in this and subsequent examples was purified by fractional distillation so that gas chromatographic survey showed only one major peak, that of 1,2-epoxy-3-phenoxy-propane. Toluene used in this and subsequent examples was distilled over sodium.

To further indicate the criticality of having at least about 1.25 moles of a saturated, aliphatic alcohol per mole of organometallic compounds present in the polymerization reaction, the procedure of Example 1 was repeated using the same materials and the same amounts of materials with the exception that the n-butyl alcohol was used in an amount to provide a mole ratio of n-butyl alcohol to dibutyl zinc of 1:1. The precent conversion was only 10.4.

Example 2

To each of a series of Pyrex glass tubes which had been flushed out with nitrogen gas there was charged 8 grams of 1,2-epoxy-3-phenoxy-propane, 16 ml. of heptane, and various amounts of dibutyl zinc and n-butyl alcohol as indicated in the table below. The tubes were provided with a nitrogen gas atmosphere, sealed and heated at 90° C. for 24 hours in an air circulating oven. A solid colored polymer was recovered in a manner described in Example 1.

The percent conversion of monomer to polymer, grams of dibutyl zinc used, and the amount of n-butyl alcohol used expressed as the mole ratio of n-butyl alcohol to dibutyl zinc are noted below.

|  | Control | 1 | 2 | 3 | 4 | 5 |
|---|---|---|---|---|---|---|
| Mole ratio of n-butyl alcohol to dibutyl zinc | 0 | 1.75:1 | 1.75:1 | 1.75:1 | 1.75:1 | 1.75:1 |
| Grams of dibutyl zinc | 0.15 | 0.1 | 0.15 | 0.2 | 0.3 | 0.5 |
| Percent conversion | 2.4 | 24 | 39 | 42 | 56 | 66 |

Heptane used in this example was distilled over sodium.

Example 3

To each of three Pyrex glass tubes which had been flushed out with nitrogen gas there was charged 8 grams of 1,2-epoxy-3-phenoxy-propane, 10 ml. of toluene, 0.12 gram of dibutyl zinc, and various amount of ethyl alcohol as indicated in the table below. Each tube was provided with a nitrogen gas atmosphere, sealed, and heated at 90° C. for 24 hours in an air circulating oven. A solid white colored polymer was recoverd in a manner described in Example 1.

|  | Control | 1 | 2 |
|---|---|---|---|
| Mole ratio of ethyl alcohol to dibutyl zinc | 0 | 1.25:1 | 1.5:1 |
| Percent conversion | 1 | 27 | 28 |
| Reduced viscosity |  | 6.1 | 5.9 |

Example 4

To each of three Pyrex glass tubes which had been flushed out with nitrogen gas there was charged 10 grams of 1,2-epoxy-3-phenoxy-propane, 12 ml. of toluene, 0.15 gram of dibutyl zinc, and various amounts of ethyl alcohol as indicated in the table below. Each tube was provided with a nitrogen gas atmosphere, sealed and heated at 90° C. for 24 hours in an air circulating oven. The solid white colored polymer was recovered in a manner described in Example 1.

|  | Control | 1 | 2 |
|---|---|---|---|
| Mole ratio of ethyl alcohol to dibutyl zinc | 0 | 1.25:1 | 1:5 |
| Percent conversion | 1 | 36 | 37 |
| Reduced viscosity |  | 6 | 3 |

Example 5

To each of three Pyrex glass tubes which had been flushed out with nitrogen gas there was charged 10 grams of 1,2-epoxy-3-phenoxy-propane and a solution of 0.15 gram of dibutyl zinc, 13 mol of toluene, and various amounts of n-butyl alcohol. Each tube was provided with a nitrogen gas atmosphere, sealed and heated for four hours in an air circulating oven. A solid white colored polymer was obtained in a manner described in Example 1. Mole ratio of n-butyl alcohol to dibutyl zinc, percent conversion of monomer to polymer and the reduced viscosity of the polymer are noted in the table below.

|  | Control | 1 | 2 |
|---|---|---|---|
| Mole ratio of ethyl alcohol to dibutyl zinc | 0 | 1.5:1 | 1.75:1 |
| Percent conversion | 0.5 | 8 | 9 |
| Reduced viscosity |  | 8.5 | 9.1 |

What is claimed is:

1. Method for the production of a polymer of an epoxide compound which comprises contacting a monomeric oxirane monoepoxide, which is free of ester, acid, amino and aldehyde groups, with at least about 0.01 percent by weight, based on the weight of said oxirane monoepoxide, of an organometallic compound having the formula:

$$R_1-Me-R_2$$

wherein $R_1$ and $R_2$ are hydrocarbon radicals having from 1 to 10 carbon atoms and being free of olefinic and acetylenic unsaturation and Me is a metal of Group II of the Periodic Table, and with from about 1.25 to about 1.75 moles of a saturated, aliphatic, monohydric primary alcohol, which is free of ester, acid, amino and aldehyde groups, per mole of said organometallic compound, whereby said oxirane monoepoxide polymerizes to form a polymer.

2. Method as defined in claim 1 wherein the said alcohol is used in an amount of from about 1.5 to about 1.75 moles, per mole of said organometallic compound.

3. Method as defined in claim 1 wherein the temperature at which the said oxirane monoepoxide is polymerized is from about 0° C. to about 200° C.

4. Method as defined in claim 1 wherein the said organometallic compound is used in an amount of from about 0.1 to about 3 percent by weight, based on the weight of said oxirane monoepoxide.

5. Method as defined in claim 1 wherein the said organometallic compound is used in an amount of from about 0.01 to about 12 percent by weight, based on the weight of the said oxirane monoepoxide.

6. Method as defined in claim 1 wherein said monomeric oxirane monoepoxide is a member selected from the group consisting of epihalohydrins, olefin oxides, and epoxy alkyl ethers having the formula:

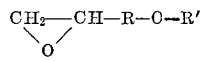

wherein R′ is a hydrocarbon radical and R is a saturated aliphatic hydrocarbon radical.

7. Method as defined in claim 1 wherein the said alcohol is ethyl alcohol.

8. Method as defined in claim 1 wherein the said alcohol is n-butyl alcohol.

9. Method as defined in claim 1 wherein the said organometallic compound is dibutyl zinc.

10. Method as defined in claim 1 wherein the said oxirane monoepoxide is 1,2-epoxy-3-phenoxy-propane.

11. Method for the production of a polymer of an epoxide compound which comprises contacting at a temperature of from about 0° C. to about 200° C. a monomeric oxirane monoepoxide, which is free of ester, acid, amino and aldehyde groups, which from about 0.01 to about 12 percent by weight, based on the weight of said monoepoxide, of an organometallic compound having the formula:

$$R_1\text{—Me—}R_2$$

wherein $R_1$ and $R_2$ are hydrocarbon radicals having from 1 to 10 carbon atoms and being free of olefinic and acetylenic unsaturation and Me is a metal of Group II of the Periodic Table, and with from about 1.25 to about 1.75 moles of a saturated, aliphatic, monohydric primary alcohol, which is free of ester, acid, amino and aldehyde groups, per mole of said organometallic compound, whereby said oxirane monoepoxide polymerizes to form a polymer.

12. Method for the production of a polymer of an epoxide compound which comprises contacting at a temperature of from about 60° C. to about 175° C. a monomeric oxirane monoepoxide, which is free of ester, acid, amino and aldehyde groups, with from about 0.1 to about 3 percent by weight, based on the weight of said monoepoxide, of an organometallic compound having the formula:

$$R_1\text{—Me—}R_2$$

wherein $R_1$ and $R_2$ are hydrocarbon radicals having from 1 to 10 carbon atoms and being free of olefinic and acetylenic unsaturation and Me is a metal of Group II of the Periodic Table, and with from about 1.25 to about 1.75 moles of a saturated, aliphatic, monohydric primary alcohol, which is free of ester, acid, amino and aldehyde groups, per mole of said organometallic compound, whereby said oxirane monoepoxide polymerizes to form a polymer.

13. Method for the production of a polymer of an epoxide compound which comprises contacting a monomeric oxirane monoepoxide, which is free of ester, acid, amino and aldehyde groups, with from about 0.01 percent by weight to about 12 percent by weight, based on the weight of said monoepoxide, of an organometallic compound having the formula:

$$R_1\text{—Me—}R_2$$

wherein $R_1$ and $R_2$ are alkyl radicals and Me is a metal of Group II of the Periodic Table, and with from about 1.25 to about 1.75 moles of a saturated, aliphatic, monohydric primary alcohol, which is free of ester, acid, amino and aldehyde groups, per mole of said organometallic compound, whereby said oxirane monoepoxide polymerizes to form a polymer.

14. Method as defined in claim 13 wherein the said organometallic compound is used in an amount of from about 0.1 to about 3 percent by weight, based on the weight of the said monoepoxide.

15. Method for the production of a solid polymer of an epoxide compound which comprises contacting under polymerizing conditions a monomeric oxirane monoepoxide free of interfering functional groups with a polymerization catalyst consisting of a dialkyl zinc compound and a saturated, aliphatic, monohydric primary alcohol which is free of interfering functional groups, wherein the monohydric alcohol is present in an amount of about 1.25 to about 1.75 moles per mole of the dialkyl zinc compound.

References Cited by the Examiner

UNITED STATES PATENTS

| | | | |
|---|---|---|---|
| 2,861,962 | 11/1958 | Borkovec | 260—2 |
| 2,870,100 | 1/1959 | Stewart et al. | 260—2 |
| 2,914,491 | 11/1959 | Bailey | 260—2 |

OTHER REFERENCES

Flory "Principles of Polymer Chemistry," page 59, Cornell Univ. Press, N.Y., 1953.

Furukawa et al.: Journal of Polymer Science, vol. 36, pages 541–3 (April 1959).

Furukawa et al.: Die Makromolekulare, vol. 32, pages 90–94 (July 1959).

WILLIAM H. SHORT, *Primary Examiner.*

MILTON STERMAN, HAROLD BURSTEIN,
JOSEPH L. SCHOFER, JOSEPH R. LIBERMAN,
*Examiners.*

D. A. HOES, T. D. KERWIN, P. H. HELLER,
R. A. BURROUGHS, *Assistant Examiners.*